US010241206B2

(12) United States Patent
Pink et al.

(10) Patent No.: US 10,241,206 B2
(45) Date of Patent: *Mar. 26, 2019

(54) SENSOR SYSTEM FOR A VEHICLE FOR DETECTING BRIDGES OR TUNNEL ENTRANCES

(71) Applicant: Robert Bosch GmbH, Stuttgart (DE)

(72) Inventors: Oliver Pink, Stuttgart (DE); Axel Buettner, Stuttgart (DE); Dominik Maucher, Stuttgart (DE); Achim Feyerabend, Heilbronn (DE); Christoph Schroeder, Pleidelsheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 331 days.

This patent is subject to a terminal disclaimer.

(21) Appl. No.: 15/207,668

(22) Filed: Jul. 12, 2016

(65) Prior Publication Data

US 2017/0023678 A1 Jan. 26, 2017

(30) Foreign Application Priority Data

Jul. 21, 2015 (DE) .................. 10 2015 213 701

(51) Int. Cl.
*G01C 3/08* (2006.01)
*G01S 17/93* (2006.01)
*G01S 17/42* (2006.01)
*G01S 13/86* (2006.01)
*G01S 13/93* (2006.01)

(52) U.S. Cl.
CPC .......... *G01S 17/936* (2013.01); *G01S 13/865* (2013.01); *G01S 17/42* (2013.01); *G01S 2013/9375* (2013.01); *G01S 2013/9385* (2013.01)

(58) Field of Classification Search
CPC ...... G01S 17/936; G01S 17/42; G01S 13/865; G01S 2013/9375; G01S 2013/9385
USPC ....................................................... 356/4.08
See application file for complete search history.

(56) References Cited

U.S. PATENT DOCUMENTS

2015/0131080 A1* 5/2015 Retterath ................ G01S 17/10
356/5.01
2017/0025019 A1* 1/2017 Pink ....................... G08G 1/167

* cited by examiner

*Primary Examiner* — Mark Hellner
(74) *Attorney, Agent, or Firm* — Norton Rose Fulbright US LLP; Gerard Messina

(57) ABSTRACT

A sensor system for a vehicle for detecting bridges and tunnels is described, which includes a lateral LIDAR sensor, which is located on a first side of the vehicle and has a detection area covering a lateral surrounding area of the vehicle, and a control unit for evaluating the measuring data from the lateral LIDAR sensor. The lateral LIDAR sensor is positioned rotated about a vertical axis so that part of the detection area of the lateral LIDAR sensor at the front in the travel direction detects an upper spatial area located at a predefined distance ahead of the vehicle. The lateral LIDAR sensor is tilted about its transverse axis with respect to the horizontal, so the detection area of the lateral LIDAR sensor detects the remote upper spatial area at a predefined height above the vehicle using its part which is at the front in the direction of travel.

15 Claims, 4 Drawing Sheets

SENSOR SYSTEM FOR A VEHICLE FOR DETECTING BRIDGES OR TUNNEL ENTRANCES

CROSS REFERENCE

The present application claims the benefit under 35 U.S.C. § 119 of German Patent Application No. DE 102015213701.5 filed on Jul. 21, 2015, which is expressly incorporated herein by reference in its entirety.

FIELD

The present invention relates to a sensor system for a vehicle for detecting bridges or tunnel entrances. The present invention further relates to a vehicle including such a sensor system and to a method for detecting bridges or tunnel entrances.

BACKGROUND INFORMATION

Modern motor vehicles are equipped with a plurality of sensors for detecting objects in the surroundings of the particular vehicle. The pieces of information gathered this way are used for controlling a plurality of assistance systems, which may assist the vehicle driver and may optionally automatically intervene in the driving process. A particularly reliable ascertainment of the vehicle surroundings is required for systems which are partially automated and, primarily, highly automated, and for autonomously driving systems. These pieces of information regarding the surroundings are then used as the basis for making decisions, such as, for example, whether a lane change may take place. In order to provide for a highly reliable ascertainment of the vehicle surroundings, multiple sensors and/or sensor technologies, such as, for example, radar, LIDAR, video or the like, are installed on the vehicle in such a way that a preferably complete 360° all-around visibility is achieved. The different sensor technologies have specific advantages and disadvantages in this case. For example, some of the surroundings sensors utilized in the vehicle nowadays, such as, for example, LIDAR or radar sensors, only have a horizontal viewing area. With the aid of radar sensors, it may be detected, for example, that an object is located in the driving area. The object cannot be classified with sufficient probability as a bridge, however, in particular at a far distance. Even if the object is detected as a bridge, it is not possible, due to the insufficient separability in the angle of elevation, to decide whether a further stationary object is located under the bridge. A detection is also nearly impossible even with the aid of horizontally oriented LIDAR sensors or laser scanners, due to the limited vertical field-of-view. On the other hand, it is not possible to reliably detect a bridge and whether it is unobstructed with the aid of video sensors, due to the insufficient resolution. This applies, in particular, when visibility is poor.

Due to the absence of a vertical viewing area and due to the limited capability to separate based on elevation, these sensors are not capable of directly measuring the underpassability of a bridge. The sensors available nowadays have functional deficiencies in the cases, in particular, in which a stationary vehicle blocks the passage.

In order to prevent the situation in which braking is carried out whenever a static object near the road is encountered, such as, e.g., a bridge or a tunnel entrance, the braking in current driver assistance systems in response to an immobile object may be postponed until the object has been reliably detected as an obstacle. This strategy is not a viable solution for highly automated systems, however.

Given that sensors and sensor sets currently available in the automotive sector have a limited capability to separate based on elevation, the sufficient detection of the underpassability and through-passability of bridges and tunnel entrances is a fundamental problem.

SUMMARY

An object of the present invention is therefore to provide a possibility for detecting bridges and tunnels and any obstacles in their areas of passage or entry. This object may be achieved by an example sensor system in accordance with the present invention, an example vehicle in accordance with the present invention, and an example method in accordance with the present invention. Advantageous specific embodiments are described herein.

In accordance with the present invention, an example sensor system for a vehicle for detecting bridges and tunnels is provided, which includes a LIDAR sensor, which is located on a first side of the vehicle and has a detection area covering a lateral surrounding area of the vehicle, and a control unit for evaluating the measuring data and signals from the lateral LIDAR sensor. In this case, the lateral LIDAR sensor is positioned rotated about a vertical axis, so that a part of the detection area of the lateral LIDAR sensor located at the front in the direction of travel detects an upper spatial area located at a predefined distance ahead of the vehicle. The lateral LIDAR sensor is also tilted about a transverse axis with respect to the horizontal, so that the detection area of the lateral LIDAR sensor detects the remote upper spatial area at a predefined height using its part which is at the front in the direction of travel. With the aid of this special orientation of the lateral LIDAR sensor, it is possible to detect objects which are located at a certain height ahead of the vehicle. In particular, superstructures of bridges, tunnels or other structures bridging the road, such as, e.g., traffic signs, may therefore be already detected at a sufficient distance ahead of the vehicle. The capability to detect the superstructure of bridges, traffic signs or similar structures bridging the road, or the outer wall located above an entrance into a tunnel with the aid of lateral LIDAR sensors proves to be particularly favorable, since these LIDAR sensors are already available in a vehicle designed for automated driving, due to the required 360° all-around visibility, and therefore no additional sensors are required. Therefore, no additional costs are incurred.

Furthermore, due to the use of LIDAR sensors, the detection method is largely independent of external light conditions. Since the detection of bridges at a certain distance only requires a relatively slight rotation of the lateral LIDAR sensor, the rotation of the sensor also does not result in a significant disadvantage in terms of the lateral all-around visibility.

With the aid of the special sensor set, the driving comfort may be substantially increased, since bridges and their underpassability are detected early and, when underpassability or through-passability is detected, autonomous braking is no longer necessary.

In one specific embodiment, it is provided that a front sensor device is also provided for detecting a front surrounding area of the vehicle below the remote upper spatial area. In this case, the control unit is designed for evaluating the through-passability of a tunnel or the underpassability of a bridge on the basis of the measuring data and signals from the lateral LIDAR sensor and from the front sensor device.

The combination of the upwardly directed, tilted lateral LIDAR sensor with a further sensor in the front area of the vehicle, which detects the surroundings essentially horizontally, makes it possible to reliably detect bridges, tunnels, and other structures bridging the road and to simultaneously draw a conclusion regarding the presence of obstacles in the area of these objects.

According to a further specific embodiment, the control unit is designed for evaluating a remote spatial area ahead of the vehicle as an obstacle when the lateral LIDAR sensor does not detect an object, while the front sensor device detects an object. Due to this special evaluation, it is possible to detect blocked or unpassable bridge underpasses and tunnel passages in a timely manner. Consequently, suitable measures, such as, e.g., an automated braking of the vehicle, may be initiated early.

In a further specific embodiment, the control unit is designed for evaluating a remote spatial area ahead of the vehicle as a through-passable tunnel or as an underpassable bridge when the lateral LIDAR sensor detects an object, while the front sensor device does not detect an object. Due to this special design of the control unit, the underpassability of bridges and the through-passability of tunnels may be detected with greater reliability. Consequently, the travel may be continued without reducing the speed.

In a further specific embodiment, the control unit is designed for evaluating a remote spatial area ahead of the vehicle as a tunnel having a through-passability which is adversely affected by an obstacle or as a bridge having an underpassability which is adversely affected by an obstacle when the lateral LIDAR sensor detects an object and the front sensor device also detects an object. Due to this special design of the control unit, obstacles in the area of bridges and tunnels may be particularly reliably detected.

In a further specific embodiment, it is provided that the front sensor device is designed in the form of a radar sensor. The combination of the specially located, lateral LIDAR sensor with the front radar sensor forms an optimal sensor combination for the reliable detection of the underpassability of bridges and the through-passability of tunnels. The radar sensor offers a reliable detection of objects located ahead of the vehicle without making it possible, however, to draw a conclusion regarding the height of a detected object. The combination of an appropriate radar sensor with the specially located, lateral LIDAR sensor, however, allows for a compensation of the inadequate elevation-related resolution of the radar sensor and, therefore, a particularly reliable detection of bridges and tunnels and their passability.

In a further specific embodiment, it is provided that the front sensor device is designed in the form of a front LIDAR sensor. The front LIDAR sensor, due to the horizontal detection area, also provides for a good detection of objects ahead of the vehicle. The combination of the front LIDAR sensor with the specially upwardly directed, lateral LIDAR sensor creates the possibility, in this case, of expanding the small elevation view angle of the front LIDAR sensor in a way which allows for a reliable detection of bridges, tunnels, and their passability.

In a further specific embodiment, the control unit is designed for carrying out the detection of the through-passability of a tunnel or the underpassability of a bridge on the basis of the raw data from the lateral LIDAR sensor and from the front sensor device. In this case, the distances of the reflections are evaluated on the basis of geometric relationships. As a result, the computing time may be substantially reduced.

In a further specific embodiment, it is provided that a second lateral LIDAR sensor, which is positioned inversely with respect to the lateral LIDAR sensor, is provided on a second side of the vehicle, which is opposite the first side. In this case, the second lateral LIDAR sensor is also positioned rotated about a vertical axis and is also tilted about a transverse axis with respect to the horizontal, so that a part of the detection area of the second lateral LIDAR sensor which is located in the front in the direction of travel detects the upper spatial area located at a predefined distance ahead of the vehicle and at a predefined height above the vehicle. Due to the bilateral placement of the specially oriented LIDAR sensors, the detection of the superstructures of bridges and tunnels and of obstacles in these areas may be substantially improved.

BRIEF DESCRIPTION OF THE DRAWINGS

The present invention is described in greater detail below based on the figures.

DETAILED DESCRIPTION OF EXAMPLE EMBODIMENTS

Given that sensors and sensor sets presently available in the automotive sector have a limited capability to separate based on elevation, the detection of the underpassability and through-passability of bridges and entries into tunnels is a problem. Due to the sensor system according to the present invention including a sensor set and a corresponding control unit, a robust detection of the underpassability and the through-passability of bridges and tunnels is made possible without the need for additional or new types of sensors. The specific arrangement of the sensors and an appropriate methodology for evaluating the measuring data makes it possible to detect whether a bridge is located in the driving area and whether an obstacle is located under the bridge or whether this bridge may be safely driven under.

Figure 1:
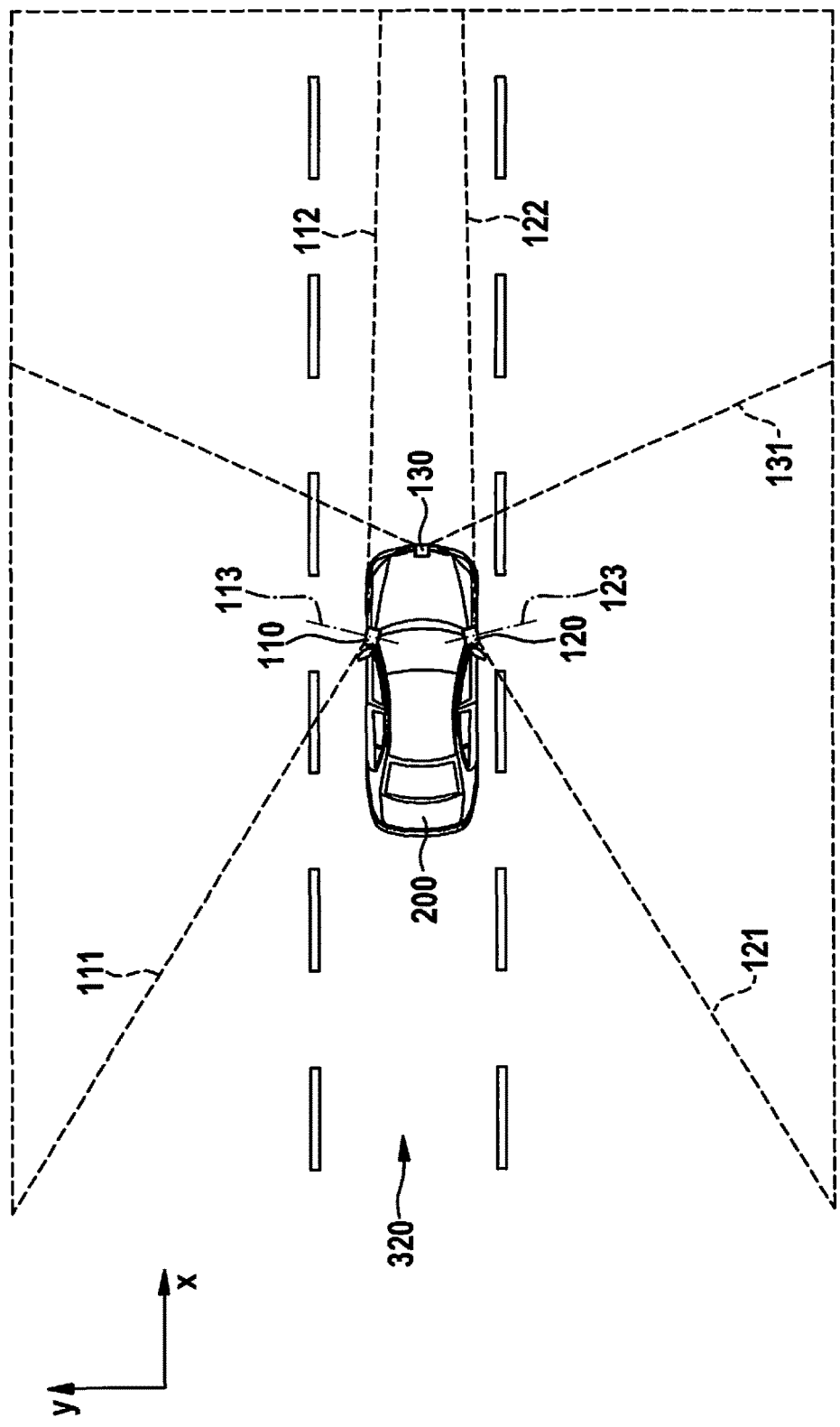
FIG. 1 schematically shows a top view of a vehicle including two lateral LIDAR sensors and a front sensor, and the detection areas of the particular sensors.

Due to a clever installation of multiple LIDAR sensors, the elevation-based resolution of the sensor set may be expanded. As a result, a vertical viewing area may be covered, which makes it possible to differentiate bridges and tunnel entrances and their underpassability and through-passability. For this purpose, FIG. 1 shows a top view of a vehicle 200 having a sensor set including a first lateral LIDAR sensor 110 located on the left vehicle side, a second lateral LIDAR sensor 120 located on the right vehicle side, and a front LIDAR sensor 130 located in the front area of vehicle 200. While front LIDAR sensor 130 horizontally scans the surroundings ahead of vehicle 200, the two lateral LIDAR sensors 110, 120 essentially cover the right and left lateral surrounding areas of vehicle 200. In FIG. 1, corresponding detection areas 111, 121, 131 of the three LIDAR sensors 110, 120, 130 are indicated using a dashed line, only the parts of the detection areas close to the vehicle being shown in each case for the sake of clarity. In order to detect a predefined upper spatial area at a predefined distance, the two lateral LIDAR sensors 110, 120 are each rotated about a vertical axis in the direction of travel, left lateral LIDAR sensor 110 in FIG. 1 being rotated in the clockwise direction and right vertical lateral LIDAR sensor 120 being rotated in the counterclockwise direction. As a result, first LIDAR sensor 110, which is located on the left side and has right edge area 112 of its detection area 111, looks into an area ahead of vehicle 200. Correspondingly, second LIDAR sensor 120, which is located on the right side and has left edge area 122 of its detection area 121, looks from the right into the area ahead of vehicle 200. The rotation angle of the two lateral LIDAR sensors 110, 120 may be selected in such a way in this case that the two detection areas 111, 121 overlap at a predefined distance.

In order to enable detection of the superstructure of a bridge or a tunnel at a predefined distance, the two lateral LIDAR sensors 110, 120 are also each tilted about a transverse axis 113, 123 with respect to the horizontal, so that the laser beams of the two LIDAR sensors 110, 120, each of which is directed forward in the direction of travel, detect an upper spatial area, which is supposed to be detected, at a predefined distance and a predefined height above the road or above the vehicle.

Figure 2:
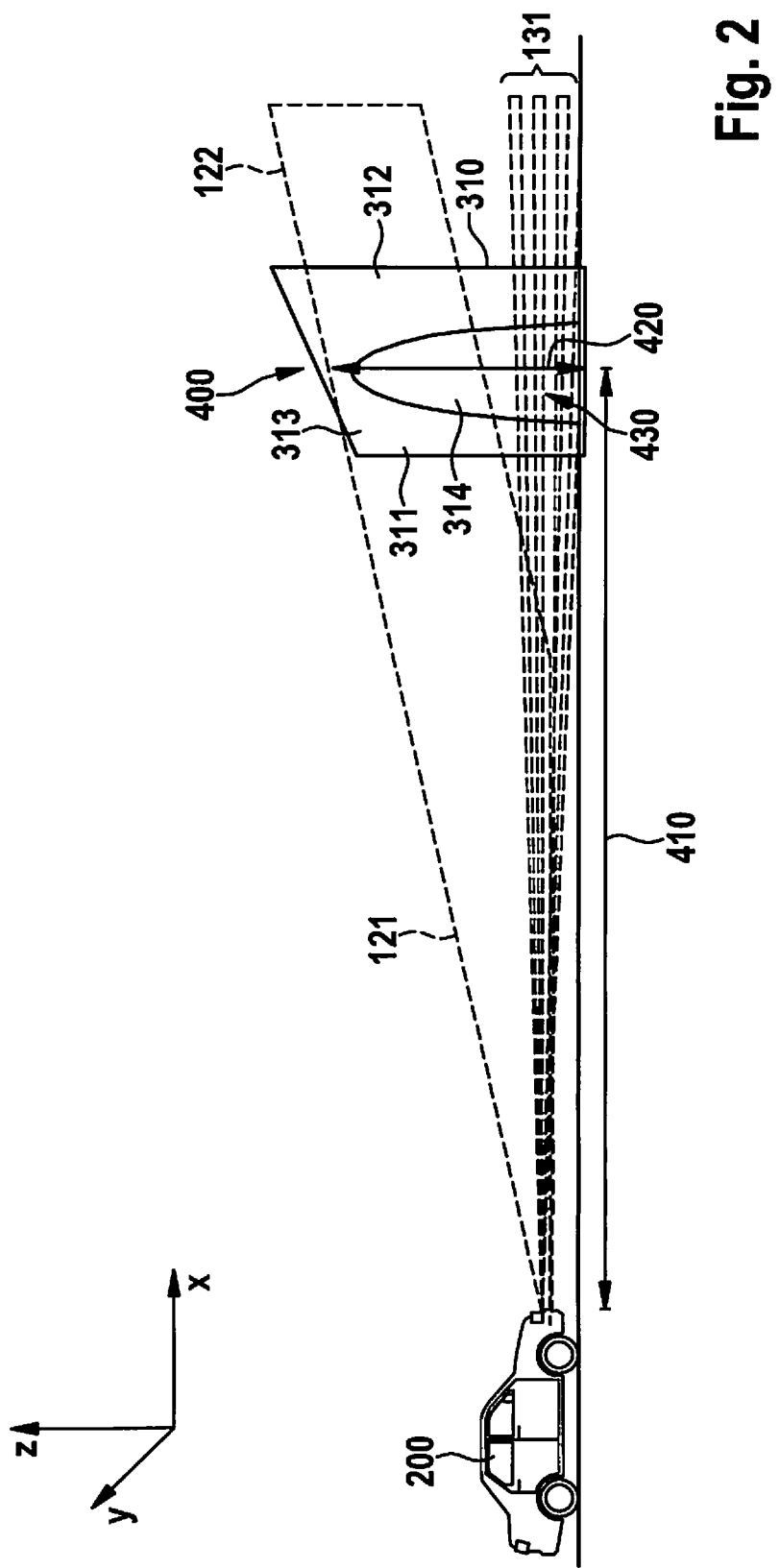
FIG. 2 shows a schematic depiction of the vehicle and a tunnel entrance located ahead of the vehicle, and the forward-directed detection areas of the lateral and front sensors.

In FIG. 2, a vehicle 200 is schematically represented as it scans a tunnel entrance located ahead of the vehicle. LIDAR sensors typically scan their surroundings in multiple planes, which are located one above the other. The total aperture of the laser scanner perpendicularly to the scanning direction, which is determined by the number of scan planes and their angle with respect to one another, may vary depending on the application. The detection area of front LIDAR sensor 130 is represented using four dashed lines in order to illustrate that a laser scanner typically covers multiple scan levels, each of which is situated offset with respect to one another by a small angle. It therefore becomes apparent that scan beams 131 of front LIDAR sensor 130, which are emitted essentially horizontally, only detect right and left outer walls 311, 312 of tunnel 310 and radiate into the tunnel in a middle area, while scan beams 121 of lateral LIDAR sensor 120, which are directed upward due to the tilt with respect to the horizontal, detect an upper spatial area 400, in particular, in which the part of the outer wall of tunnel 310 located above tunnel entrance 314 is located. It further becomes apparent from FIG. 2 that distance 410 and height 420 at which upper spatial area 400 detected by edge beams 122 is located may be set via the selection of a suitable tilt angle. This tilt angle may be varied as necessary, a relatively small tilt angle being selected for a preferably early detection. The typical heights of bridges, for example, may be used as criteria for the beam direction and the modified detection area of lateral LIDAR sensors 110, 120.

Figure 3:
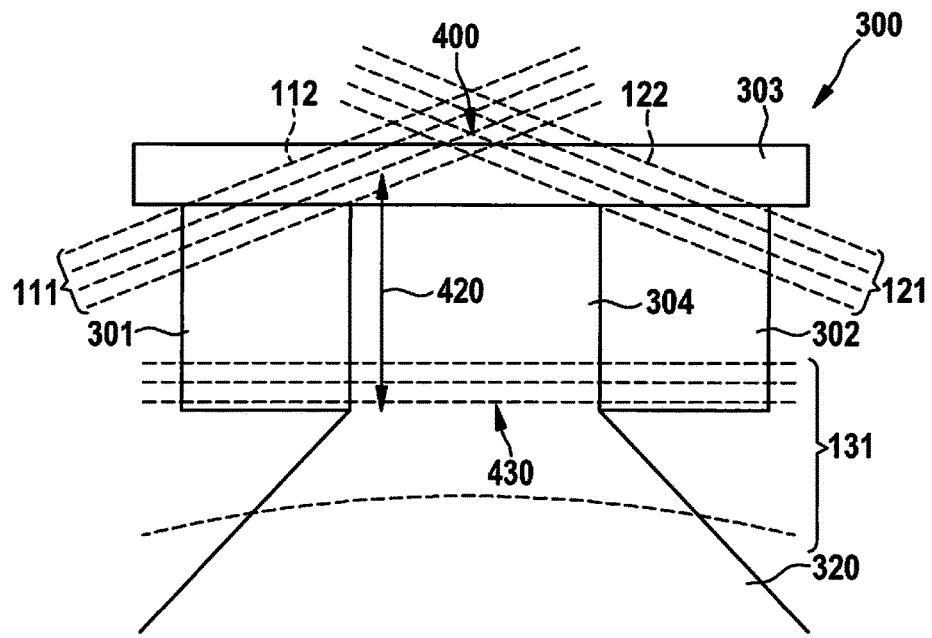
FIG. 3 shows a schematic depiction of a bridge located ahead of the vehicle, and of the detection areas of the vehicle sensors.

FIG. 3 shows a schematic depiction of a bridge 300 located in the direction of travel ahead of the vehicle. In order to illustrate the measuring principle of the sensor system according to the present invention, the detection areas of the sensor set shown in FIG. 1, which typically cover multiple scan planes offset with respect to one another, are represented using four dashed lines in each case. It therefore becomes apparent that detection area 131 of front LIDAR sensor 130, which is oriented essentially horizontally, detects left and right bridge pillars 301, 302 and looks into bridge underpass 304 with its middle section. However, detection areas 111, 121 of the two lateral LIDAR sensors 110, 120 are directed toward bridge superstructure 303 situated at a predefined height 420. By way of an evaluation of the measuring data, the control unit of the sensor system may detect a structure bridging road 320 on the basis of detected objects 301, 302, 303, such as, for example, a bridge, a tunnel, or a road sign situated above the road. Since front LIDAR sensor 330 in the present case does not detect an object in the area of bridge underpass 304, detected bridge 300 is classified as being underpassable. Consequently, the travel may continue unobstructed.

Figure 4:
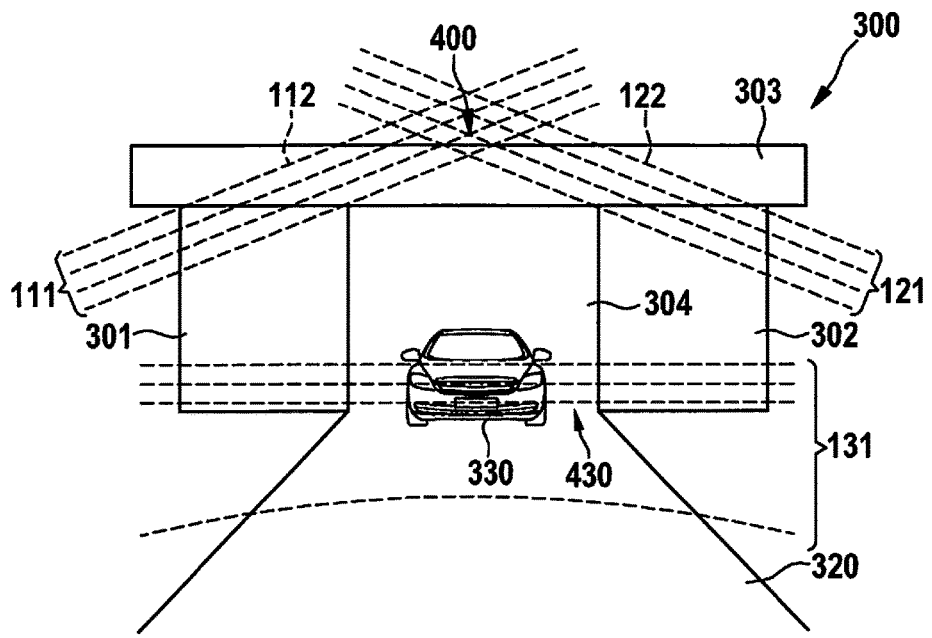
FIG. 4 shows a schematic depiction of a bridge having an underpass blocked by an obstacle, and of the detection areas of the forward-directed vehicle sensors detecting the bridge and the obstacle.

If an obstacle 330, such as a vehicle, for example, is located in the area of tunnel passage 304, however, this obstacle 330 is detected by scan beams 131 of front LIDAR sensor 130 in the corresponding area. Consequently, the detected overall structure is classified as a non-underpassable bridge 300 due to an obstacle 330 blocking bridge underpass 304. Consequently, suitable measures, such as, for example, a deceleration of the vehicle, may be implemented. A corresponding situation is represented in FIG. 4.

If an object is detected only by front LIDAR scanner (sensor) 130 in a lower spatial area 430 underneath upper spatial area 400, while lateral LIDAR scanners (sensors) 110, 120 do not detect a corresponding object in lower spatial area 400, the detected object is classified as an obstacle. Suitable measures, such as, for example, a deceleration of the vehicle, may be implemented in this case as well.

In addition to front LIDAR sensor 130, vehicle 200 may also be equipped with a forward-directed radar sensor. Such a radar sensor makes it possible to detect a static object ahead of the vehicle. Since it is not possible to draw a conclusion, on the basis of the radar measuring data, whether this is an obstacle blocking the road or whether this is an underpassable bridge, it is meaningful to carry out a joint evaluation of the measurements carried out by the radar sensor and the LIDAR sensors. Therefore, in the event that the radar sensor detects a static object, while the front LIDAR sensor does not detect an object in the road area and the two lateral LIDAR sensors correspondingly detect objects, the object detected by the radar sensor possibly is not evaluated as an obstacle. In this case, the object detected by the radar sensor is very likely an underpassable bridge.

In the event, as well, that the lateral LIDAR scanner does not detect an object, while the front LIDAR scanner detects an object, and in the case that both the lateral LIDAR scanner and the front LIDAR scanner detects an object, the speed may be reduced or the vehicle may be decelerated to a standstill, for example, in the case of automated driving. In the event that the lateral LIDAR scanner detects an object and the front LIDAR scanner does not detect an object, the travel may be continued as planned, however, without an additional maneuver.

Figure 5:
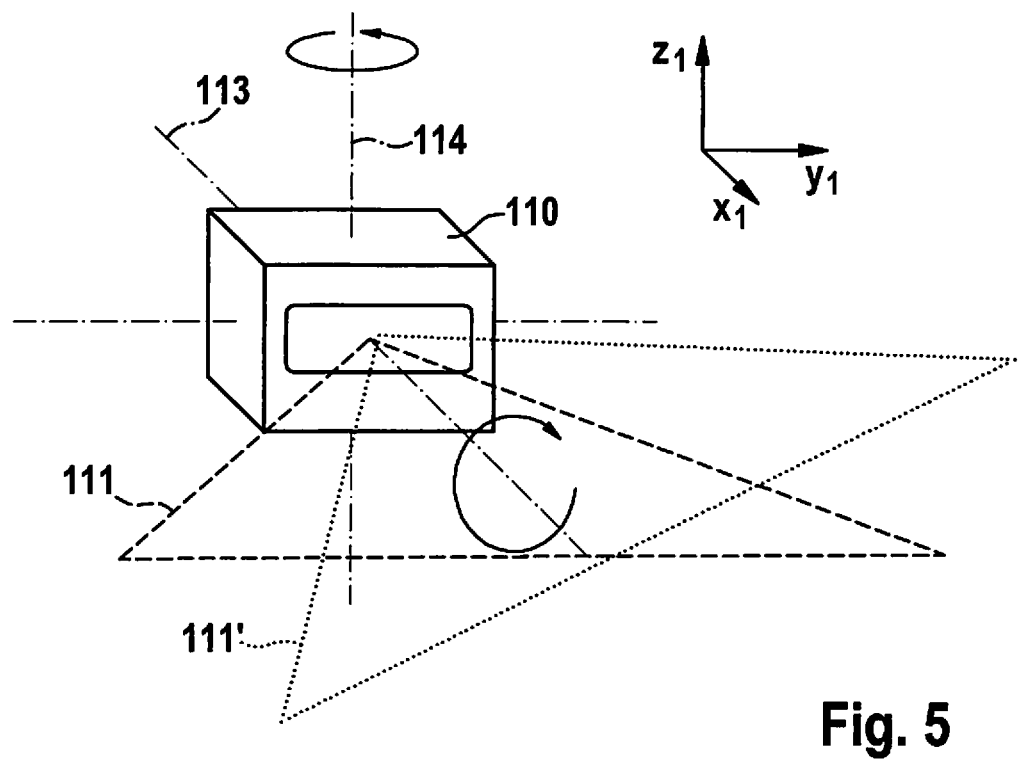
FIG. 5 shows a schematic depiction of a lateral LIDAR sensor and its reference system for illustrating the rotation of the first lateral LIDAR sensor.

FIG. 5 illustrates the rotation of a lateral LIDAR sensor carried out within the scope of the modification proposed here. For this purpose, first lateral LIDAR sensor 110 located on the left side of the vehicle is schematically shown in a highly simplified depiction. In this case, triangle 111 represented using a dashed line illustrates the scan plane of sensor 110 in the starting state. LIDAR sensor 110 preferably has its own coordinate system $(x_1, y_1, z_1)$, which is dependent on the installation site and orientation of the LIDAR sensor and, therefore, does not need to coincide with the coordinate system of vehicle 200 represented in FIG. 1.

In this case, the $x_1$ coordinate axis corresponds to the main beam direction of laser scanner 110. Corresponding transverse axis 113 of sensor 110 is represented using a dash-dotted line. Transverse axis 113 preferably corresponds to the main beam axis of the laser scanner. Depending on the design of the sensor, the transverse axis and the main beam axis may deviate from one another, however. Furthermore, the $z_1$ coordinate axis corresponds to vertical axis 114 of the sensor, which is preferably oriented vertically in the starting state and which is also represented using a dash-dotted line. As a result of a rotation of sensor 110 about vertical axis 114 and a simultaneous tilting of the sensor about its transverse axis 113, detection area 111 of sensor 110 moves out of its original position into obliquely extending plane 111', which is represented using the dotted line.

Figure 6:
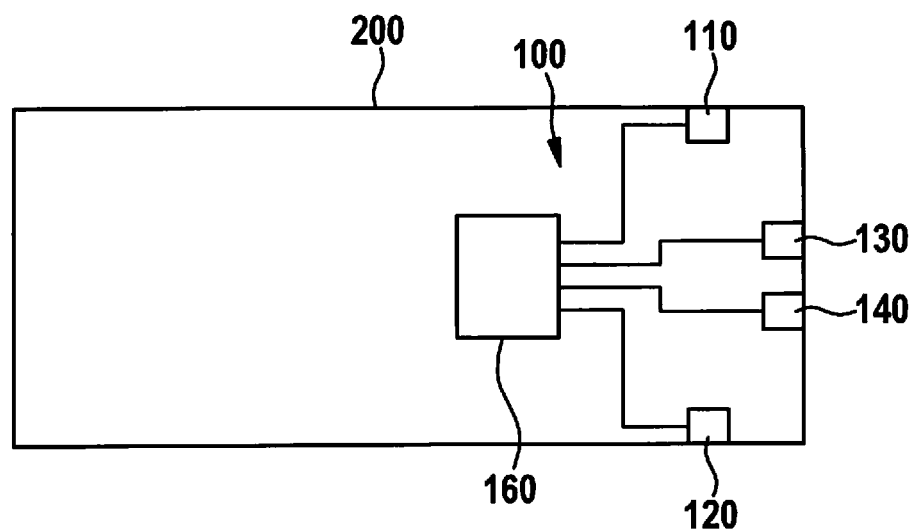
FIG. 6 shows a schematic depiction of the sensor system located in the vehicle.

FIG. 6 shows a greatly simplified depiction of a vehicle 200 including a sensor system 100 according to the present invention. In this case, sensor system 100 includes a sensor set including two lateral LIDAR sensors 110, 120, which are located on opposite vehicle sides, and a front LIDAR sensor 130, which is located in the vehicle front and is directed toward the front. Furthermore, an additional radar sensor 140 is also provided, which is installed in the vehicle front and has a forward-directed detection area. LIDAR sensors 110, 120, 130 and radar sensor 140 are connected to a shared control unit 160. In this case, control unit 160 may be designed as part of a higher-order control unit (not shown here). Furthermore, control unit 160 may form a higher-order control instance combining multiple control units.

As is schematically represented in FIG. 5, sensors 110 through 140 may be connected to control unit 160 via separate connection lines. Alternatively, sensors 110 through 140 may be connected to control unit 160 both individually and in groups via a shared bus connection. Sensor system 100 shown here by way of example may also include further sensors installed in the vehicle.

The cases described above may be expanded with further cases as necessary. This is meaningful, in particular, when there is a high level of uncertainty with respect to the classification of the detected objects when detecting objects with the aid of multiple sensors. In this regard, the evaluation algorithm may also be expandable, in principle, with additional cases. For example, even more pieces of measuring data and information may be incorporated into the decision as to whether the object detected ahead of the vehicle is a bridge or a tunnel and whether the bridge passage or the tunnel entrance is blocked by an obstacle. On the basis of the evaluation of the measuring data from the sensor, the control unit may decide whether driving maneuvers should be implemented in order to rule out a danger posed by an obstacle which is adversely affecting the lane.

Although the present invention has been described above on the basis of specific exemplary embodiments, it is not at all limited thereto. Those skilled in the art will therefore suitably modify the described features and combine them with one another without departing from the core of the present invention.

What is claimed is:

1. A sensor system for a vehicle for detecting bridges and tunnels, comprising:
   a lateral LIDAR sensor located on a first side of the vehicle, the lateral LIDAR sensor having a detection area covering a lateral surrounding area of the vehicle; and
   a control unit to evaluate measuring data from the lateral LIDAR sensor;
   wherein the lateral LIDAR sensor is positioned rotated about a vertical axis of the lateral LIDAR sensor so that a part of a detection area of the lateral LIDAR sensor located at a front in a direction of travel of the vehicle detects an upper spatial area located at a predefined distance ahead of the vehicle, and the lateral LIDAR sensor being also tilted about a transverse axis of the lateral LIDAR sensor with respect to the horizontal, so that the detection area of the lateral LIDAR sensor detects a remote upper spatial area at a predefined height using the part which is at the front in the direction of travel.

2. The sensor system as recited in claim 1, wherein a front sensor device is also provided to detect a front surrounding area of the vehicle below the remote upper spatial area, the control unit being designed to evaluate a through-passability of a tunnel or an underpassability of a bridge, based on the measuring data from the lateral LIDAR sensor and measuring data from the front sensor device.

3. The sensor system as recited in claim 2, wherein the control unit is designed to evaluate a remote spatial area ahead of the vehicle as an obstacle, when the lateral LIDAR sensor does not detect an object, while the front sensor device detects an object.

4. The sensor system as recited in claim 2, wherein the control unit is designed to evaluate a remote spatial area ahead of the vehicle as a through-passable tunnel or as an underpassable bridge, when the lateral LIDAR sensor detects an object, while the front sensor device does not detect an object.

5. The sensor system as recited in claim 2, wherein the control unit is designed to evaluate a remote spatial area ahead of the vehicle as a tunnel having a through-passability which is adversely affected by an obstacle or as a bridge having an underpassability which is adversely affected by an obstacle, when the lateral LIDAR sensor detects an object and the front sensor device also detects an object.

6. The sensor system as recited in claim 2, wherein the front sensor device is a front LIDAR sensor.

7. The sensor system as recited in claim 6, wherein a front radar sensor is additionally provided, and the control unit is designed to evaluate the remote spatial area ahead of the vehicle as a through-passable tunnel or as an underpassable bridge, when the radar sensor detects an object, while the lateral LIDAR sensor detects an object and the front LIDAR sensor does not detect an object.

8. The sensor system as recited in claim 2, wherein the control unit is designed to evaluate the through-passability of a tunnel or the underpassability of a bridge based on raw data from the lateral LIDAR sensor and from the front sensor device, the distances of the reflections being evaluated on the basis of geometric relationships.

9. The sensor system as recited in claim 2, wherein a second lateral LIDAR sensor, which is positioned inversely with respect to the lateral LIDAR sensor, is provided on a second side of the vehicle, which is opposite the first side.

10. A vehicle including a sensor system, the sensor system comprising:
   a lateral LIDAR sensor located on a first side of the vehicle, the lateral LIDAR sensor having a detection area covering a lateral surrounding area of the vehicle; and
   a control unit to evaluate measuring data from the lateral LIDAR sensor;
   wherein the lateral LIDAR sensor is positioned rotated about a vertical axis of the lateral LIDAR sensor so that a part of a detection area of the lateral LIDAR sensor located at a front in a direction of travel of the vehicle detects an upper spatial area located at a predefined distance ahead of the vehicle, and the lateral LIDAR sensor being also tilted about a transverse axis of the lateral LIDAR sensor with respect to the horizontal, so that the detection area of the lateral LIDAR sensor detects a remote upper spatial area at a predefined height using the part which is at the front in the direction of travel.

11. A method for detecting bridges and tunnels ahead of a vehicle, comprising:
scanning an upper spatial area situated at a predefined distance and at a predefined height ahead of the vehicle using a lateral LIDAR sensor, which is located on one side of the vehicle and has been rotated about a vertical axis of the lateral LIDAR sensor and has been tilted about a transverse axis with respect to the horizontal;
scanning a remote lower spatial area below the remote upper spatial area with the aid of a front sensor device for detecting a front surrounding area of the vehicle;
and evaluating through-passability of a tunnel or under-passability of a bridge on the basis of measuring data from the lateral LIDAR sensor and measuring data from the front sensor device.

12. The method as recited in claim 11, wherein a remote spatial area ahead of the vehicle is evaluated as an obstacle, when the lateral LIDAR sensor does not detect an object, while the front sensor device detects an object.

13. The method as recited in claim 11, wherein a remote spatial area ahead of the vehicle is evaluated as a through-passable tunnel or as an underpassable bridge, when the lateral LIDAR sensor detects an object, while the front sensor device does not detect an object.

14. The method as recited in claim 11, wherein a remote spatial area ahead of the vehicle is evaluated as a tunnel having a through-passability which is adversely affected by an obstacle or as a bridge having an underpassability which is adversely affected by an obstacle, when the lateral LIDAR sensor detects an object and the front sensor device also detects an object.

15. The method as recited in one of claim 11, wherein a spatial area located ahead of the vehicle is scanned with the aid of an additional front radar sensor for detecting a front surrounding area of the vehicle, and a remote spatial area ahead of the vehicle is evaluated as a through-passable tunnel or as an underpassable bridge when the radar sensor detects an object, while the lateral LIDAR sensor detects an object and the front LIDAR sensor does not detect an object.

* * * * *